ns

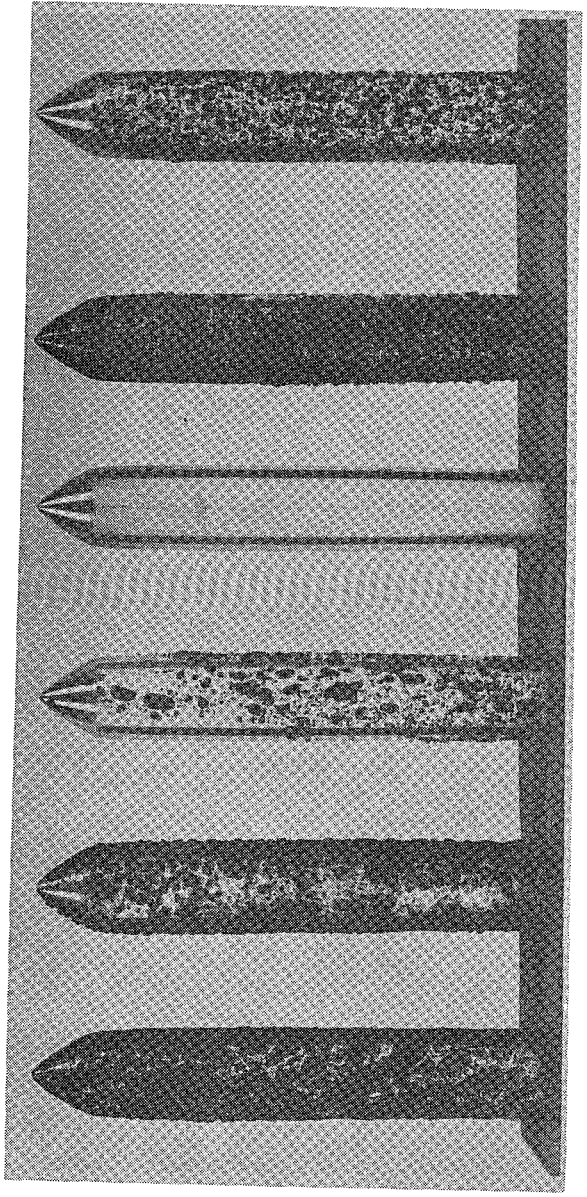

United States Patent Office 3,382,056
Patented May 7, 1968

3,382,056
MALEIC ANHYDRIDE COPOLYMERS AS RUST INHIBITORS
Enver Mehmedbasich, El Cerrito, Calif., assignor to Chevron Research Company, San Francisco, Calif., a corporation of Delaware
Filed June 3, 1966, Ser. No. 555,198
5 Claims. (Cl. 44—62)

ABSTRACT OF THE DISCLOSURE

Rust inhibitors for hydrofined fuels which are relatively low molecular weight maleic anhydride aliphatic hydrocarbon 1-olefin copolymers and their hydrolyzed product.

---

This invention concerns novel hydrofined fuel compositions containing antirust additives.

In the handling of fuels, the fuel is frequently stored or transported in steel or iron containers or pipelines. Almost invariably, the fuels contain traces or more of water which react with the container, resulting in rusting and contamination of the fuel. In transporting fuels by ships, the introduction of minor amounts of salt water into the fuel greatly enhances the rusting problem.

While petroleum has numerous natural rust inhibitors, in hydrofined fuels these inhibitors are present in only insignificant amounts or totally removed. It is therefore common practice to add antirust additives to the hydrofined fuels to minimize rusting. Numerous antirust additives are commercially available. A wide variety of organic compounds with different functionalities have been found effective. Carboxylic acids, esters, and phosphate salts have all been employed with varying degrees of success.

It has now been found that excellent rust protection can be achieved by introducing into a hydrofined fuel an effective amount of a copolymer of maleic anhydride (or its hydrolysis product, the dicarboxylic acid) and hydrocarbon 1-olefins of from 8 to 22 carbon atoms. The maleic anhydride derivative is preferred, particularly when present as a concentrate prior to dilution in the fuel.

The accompanying figure is a photograph of spindles used in a rust test comparing an exemplary composition of this invention with various other rust inhibitors.

The maleic anhydride copolymer has the following formula:

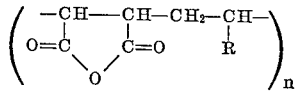

while the maleic or fumaric acid olefin copolymer has the following formula:

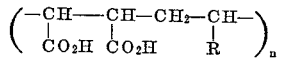

wherein R is aliphatic hydrocarbon of from 6 to 20 carbon atoms, more usually of from 8 to 18 carbon atoms, and $n$ is an integer of from 4 to 20, more usually of from 6 to 16. Preferably, R is in the range of 12 to 18 carbon atoms with an over-all average number of carbon atoms in the range of 14 to 16.

The end groups of the polymer will be derived from the catalyst or be derived according to the various methods of termination in free radical polymerization. The polymeric chain may terminate by transfer, coupling or disproportionation, resulting in alkyl groups, alkenyl groups, succinyl groups, maleyl groups or radicals derived from the initiator.

The copolymerization of maleic anhydride with aliphatic 1-olefins is well known in the art. See for example U.S. Patent No. 3,051,562. Therefore, the polymerization conditions will be discussed only briefly.

The olefins which find use include octene, nonene, decene, dodecene, tetradecene, pentadecene, hexadecene, octadecene, nonadecene, eicosene, tetrapropylene, tetraisobutylene, hexaproplyene, etc. The olefins may be straight or branched chain, usually being straight chain. Generally, a mixture of olefins will be used rather than a single olefin. When using mixed olefins, superior solubility in hydrocarbons is obtained. The mixture will generally have not more than about 50% of any single olefin and preferably not more than about 30 mole percent of any single olefin.

The free radical catalyst used for the polymerization may be on organic compound which, at a temperature in the range of 50° to 150° C., decomposes to form free radicals which may then initiate the polymeric chain. However, temperatures outside this range may be used advantageously under some conditions. Various azo, hydroperoxide or peroxidic catalysts may be used having the desired decomposition rate at the chosen temperature of polymerization.

In carrying out the polymerizations, a solvent, such as inert hydrocarbons or halohydrocarbons, may be used to advantage. Illustrative of such solvents are benzene, toluene, chlorobenzene, etc.

Usually, the solvent will be from 20 to 80 weight percent of the total reaction mixture, more usually about 30 to 70 weight percent.

The mole ratio of α-olefin to maleic anhydride will generally be about 0.9–1.2:1.2–0.9, more usually about 1:1. The ratio of olefin to catalyst will generally be about 1:0.005–0.1 mole ratio.

The composition of this invention are found to be effective for providing significant protection against rust in a concentration of as little as 2.5 parts per million (p.p.m.). Usually, at least 5 p.p.m. will be used and generally the concentration of the additive will range from about 10 p.p.m. to 100 p.p.m.

The additive of this invention is soluble in a hydrocarbon media and therefore can be readily prepared as a concentrate. Generally, the concentrate will be in amounts of from 10 to 60 weight percent.

Hydrofined fuels usually boil in the range of about 325° to 750° F. The percent sulfur is less than 0.5 weight percent, while percent nitrogen is less than about 0.2 weight percent.

The following example is offered by way of illustration and not by way of limitation.

Example I—Preparation of maleic anhydride-α-olefin copolymer

Into a reaction flask was introduced 243 g. (1.0 mole) of $C_{15-20}$ cracked wax 1-olefins,[1] 98 g. (1.0 mole) of maleic anhydride and 341 g. of benzene. The mixture was stirred at a temperature of 140° F. and 9.7 g. (0.04 mole) of benzoyl peroxide in a minimum of benzene added. The solution was then heated at 185° F. for 12 hours. The product was characterized by its infrared spectrum and viscosity (minimum $V_{100° F.}=75$ Saybolt Universal Seconds (SUS)).

In order to demonstrate the excellent effectiveness of the compositions of this invention as rust inhibitors, the

[1] $C_{15-20}$

| No. of carbon atoms | Mole percent |
|---|---|
| 14 | 1 |
| 15 | 12 |
| 16 | 19 |
| 17 | 18 |
| 18 | 18 |
| 19 | 17 |
| 20 | 14 |
| 21 | 1 |
| 1-olefin | 94 |
| Straight chain | 86 | exemplary composition of Example I was tested according to the rusting test ASTM D 665-60, using synthetic sea water. The test was carried out at 140° F. for 20 hours. The spindles are rated from 1 to 7, 7 being completely rusted and 1 being no rust.

The accompanying figure is a comparison of various additives at 25 p.p.m. in a hydrofined diesel fuel (percent S=0.38; percent N=0.06; ASTM dist. ° F.=412-654; gravity, AP1=32.8; vis., 100° F.=39.8 SUS). 1 is the base fuel; 2 and 6 are dimeric linoleic acids from different sources; 3 is a mixed mono- and dialkyl phosphate salt of a low molecular weight amine; 4 is the exemplary composition of Example I; 5 is a branched chain alkenyl succinic acid.

The ratings for the six spindles are as follows:

| Spindle No. | Rating |
| --- | --- |
| 1 | 6 |
| 2 | 5 |
| 3 | 3 |
| 4 | 1 |
| 5 | 6 |
| 6 | 4 |

It is evident from the above results that the compositions of this invention are extremely effective in providing rust protection in fuels devoid of natural rust inhibitors. Moreover, the additives of this invention are compatible with the numerous other additives which are frequently included in fuels: detergents, antidetonants, scavengers, antiicing, etc.

As will be evident to those skilled in the art, various modifications on this invention can be made or followed, in the light of the foregoing disclosure and discussion, without departing from the spirit or scope of the disclosure or from the scope of the following claims.

I claim:
1. A hydrofined fuel composition comprising a hydrocarbon fuel boiling in the range of about 325° to 750° F. and having in an amount sufficient to provide rust protection a composition of the formula:

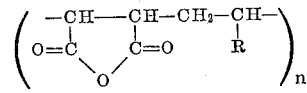

either as the anhydride or as the hydrolyzed carboxylic acid form, wherein R is an aliphatic hydrocarbon group of from 6 to 20 carbon atoms and $n$ is an integer of from 4 to 20.

2. A composition according to claim 1, wherein R is of from 8 to 18 carbon atoms and $n$ is an integer of from 6 to 16.

3. A composition according to claim 1, wherein R is in the range of 12 to 18 carbon atoms and the over-all average number of carbon atoms is in the range of 14 to 16.

4. A composition according to claim 3, wherein R is straight chain.

5. A composition according to claim 3, wherein any one R is present in not more than 30 mole percent.

References Cited

UNITED STATES PATENTS 3,010,810  11/1961  Stayner et al. _____ 44—62

DANIEL E. WYMAN, *Primary Examiner.*

W. J. SHINE, *Assistant Examiner.*